(12) United States Patent
Kritt et al.

(10) Patent No.: US 8,924,733 B2
(45) Date of Patent: Dec. 30, 2014

(54) ENABLING ACCESS TO REMOVABLE HARD DISK DRIVES

(75) Inventors: Barry Alan Kritt, Raleigh, NC (US); Douglas Alan Law, Chapel Hill, NC (US); Juan F. Vargas, Morrisville, NC (US)

(73) Assignee: International Business Machines Corporation, Armonk, NY (US)

( * ) Notice: Subject to any disclaimer, the term of this patent is extended or adjusted under 35 U.S.C. 154(b) by 888 days.

(21) Appl. No.: 12/814,586

(22) Filed: Jun. 14, 2010

(65) Prior Publication Data

US 2011/0307708 A1 Dec. 15, 2011

(51) Int. Cl.
| | |
|---|---|
| G06F 21/80 | (2013.01) |
| H04L 9/32 | (2006.01) |
| G06F 21/34 | (2013.01) |
| H04L 9/00 | (2006.01) |
| H04L 9/08 | (2006.01) |
| H04K 1/00 | (2006.01) |
| G06F 21/74 | (2013.01) |

(52) U.S. Cl.
CPC *G06F 21/80* (2013.01); *H04L 9/32* (2013.01); *G06F 21/34* (2013.01); *H04L 9/00* (2013.01); *H04L 9/08* (2013.01); *H04L 9/0822* (2013.01); *H04L 9/0863* (2013.01); *H04K 1/00* (2013.01); *G06F 21/74* (2013.01); *G06F 2221/2105* (2013.01); *G06F 2221/2147* (2013.01)
USPC .............................. 713/182; 713/185; 380/44

(58) Field of Classification Search
CPC ......... G06F 21/00; G06F 21/62; G06F 21/34; H04N 21/42227; H04L 9/16; H04L 9/08; H04K 1/00
USPC ......... 713/182, 2, 100, 185; 726/19; 365/200; 380/44
See application file for complete search history.

(56) References Cited

U.S. PATENT DOCUMENTS

| | | | | | |
|---|---|---|---|---|---|
| 4,264,782 | A | * | 4/1981 | Konheim | 705/75 |
| 4,672,572 | A | * | 6/1987 | Alsberg | 726/11 |

(Continued)

FOREIGN PATENT DOCUMENTS

| | | | |
|---|---|---|---|
| EP | 2043055 A1 | * | 4/2009 |
| JP | 2006155014 | | 6/2006 |
| JP | 2007241988 | | 9/2007 |

OTHER PUBLICATIONS

Morgan, "Web application security—SQL injection attacks", 2006.*

(Continued)

*Primary Examiner* — O. C. Vostal (74) *Attorney, Agent, or Firm* — Yee & Associates, P.C.; Steven L. Bennett (57) ABSTRACT

A method, apparatus, and computer program product for accessing a device. The device receives a key from an operating system in response to the device in a locked state being connected to a data processing system after the operating system for the data processing system is running. The device compares the key received from the operating system with a set of keys stored in the device. The key is based on a system identifier for the data processing system and a password. The device determines whether a match is present between the key and the set of keys. The device changes the device from the locked state to an unlocked state in response to a determination that the match is present.

17 Claims, 6 Drawing Sheets

(56) References Cited

U.S. PATENT DOCUMENTS

| | | | | |
|---|---|---|---|---|
| 4,959,860 A * | 9/1990 | Watters et al. | | 726/19 |
| 5,586,301 A * | 12/1996 | Fisherman et al. | | 711/152 |
| 6,148,342 A * | 11/2000 | Ho | | 709/225 |
| 6,161,139 A * | 12/2000 | Win et al. | | 709/225 |
| 6,272,631 B1 * | 8/2001 | Thomlinson et al. | | 713/155 |
| 6,275,933 B1 * | 8/2001 | Fine et al. | | 713/2 |
| 6,334,188 B1 * | 12/2001 | Maria | | 713/182 |
| 6,886,095 B1 * | 4/2005 | Hind et al. | | 713/168 |
| 7,178,025 B2 * | 2/2007 | Scheidt et al. | | 713/168 |
| 7,338,443 B1 * | 3/2008 | Tucker | | 600/300 |
| 7,552,467 B2 * | 6/2009 | Lindsay | | 726/5 |
| 7,797,278 B2 * | 9/2010 | Katoh et al. | | 707/640 |
| 7,917,963 B2 * | 3/2011 | Goyal et al. | | 726/29 |
| 8,209,544 B2 * | 6/2012 | Maheshwari et al. | | 713/189 |
| 8,255,697 B2 * | 8/2012 | Mathiassen et al. | | 713/186 |
| 8,290,159 B2 * | 10/2012 | Terao | | 380/227 |
| 8,387,125 B2 * | 2/2013 | Kosaka et al. | | 726/9 |
| 8,516,250 B2 * | 8/2013 | Lohiniva et al. | | 713/168 |
| 2002/0171546 A1 * | 11/2002 | Evans et al. | | 340/540 |
| 2003/0037237 A1 * | 2/2003 | Abgrall et al. | | 713/166 |
| 2004/0107354 A1 * | 6/2004 | Larsen | | 713/189 |
| 2004/0153649 A1 * | 8/2004 | Rhoads et al. | | 713/176 |
| 2004/0158734 A1 * | 8/2004 | Larsen | | 713/200 |
| 2004/0170068 A1 * | 9/2004 | Williams | | 365/200 |
| 2005/0097348 A1 * | 5/2005 | Jakubowski et al. | | 713/200 |
| 2005/0251680 A1 * | 11/2005 | Brown et al. | | 713/171 |
| 2006/0048039 A1 | 3/2006 | Barrett et al. | | |
| 2006/0064605 A1 * | 3/2006 | Giobbi | | 713/193 |
| 2006/0085845 A1 * | 4/2006 | Davis et al. | | 726/6 |
| 2006/0129797 A1 * | 6/2006 | Durfee et al. | | 713/2 |
| 2007/0016958 A1 * | 1/2007 | Bodepudi et al. | | 726/27 |
| 2007/0022299 A1 * | 1/2007 | Yoshimura | | 713/183 |
| 2007/0043667 A1 * | 2/2007 | Qawami et al. | | 705/50 |
| 2007/0162973 A1 * | 7/2007 | Schneier et al. | | 726/22 |
| 2007/0220595 A1 * | 9/2007 | M'raihi et al. | | 726/5 |
| 2007/0299915 A1 * | 12/2007 | Shraim et al. | | 709/206 |
| 2008/0028229 A1 * | 1/2008 | Priebatsch | | 713/185 |
| 2008/0052526 A1 * | 2/2008 | Dailey et al. | | 713/186 |
| 2008/0082824 A1 * | 4/2008 | Ibrahim et al. | | 713/171 |
| 2008/0123850 A1 * | 5/2008 | Bhatnagar et al. | | 380/259 |
| 2008/0178275 A1 * | 7/2008 | Chung | | 726/9 |
| 2008/0211624 A1 * | 9/2008 | Micali et al. | | 340/5.6 |
| 2008/0222423 A1 * | 9/2008 | Rodriguez et al. | | 713/182 |
| 2008/0263656 A1 * | 10/2008 | Kosaka et al. | | 726/20 |
| 2009/0044279 A1 * | 2/2009 | Crawford et al. | | 726/26 |
| 2009/0077618 A1 * | 3/2009 | Pearce et al. | | 726/1 |
| 2009/0110191 A1 * | 4/2009 | Sanvido et al. | | 380/44 |
| 2009/0113543 A1 * | 4/2009 | Adams et al. | | 726/18 |
| 2009/0183256 A1 | 7/2009 | Mo et al. | | |
| 2009/0276475 A1 * | 11/2009 | Ramsey et al. | | 707/204 |
| 2009/0288143 A1 * | 11/2009 | Stebila et al. | | 726/3 |
| 2010/0015949 A1 * | 1/2010 | Bradley | | 455/410 |
| 2010/0019920 A1 * | 1/2010 | Ketari | | 340/686.6 |
| 2010/0115582 A1 * | 5/2010 | Sapp et al. | | 726/1 |
| 2010/0216429 A1 * | 8/2010 | Mahajan | | 455/411 |
| 2010/0217972 A1 * | 8/2010 | Lohiniva et al. | | 713/153 |
| 2010/0220856 A1 * | 9/2010 | Kruys et al. | | 380/44 |
| 2010/0228991 A1 * | 9/2010 | Billings et al. | | 713/185 |
| 2010/0251339 A1 * | 9/2010 | McAlister | | 726/4 |
| 2011/0066839 A1 * | 3/2011 | Wang et al. | | 713/2 |
| 2011/0091040 A1 * | 4/2011 | Krysiak et al. | | 380/283 |
| 2011/0113242 A1 * | 5/2011 | McCormack | | 713/165 |
| 2011/0207454 A1 * | 8/2011 | Garg et al. | | 455/432.1 |
| 2011/0210818 A1 * | 9/2011 | Denison et al. | | 340/5.6 |
| 2011/0241826 A1 * | 10/2011 | Blackwell et al. | | 340/5.22 |
| 2011/0265160 A1 * | 10/2011 | Nettleton | | 726/6 |
| 2012/0107749 A1 * | 5/2012 | Tono et al. | | 430/325 |
| 2012/0179902 A1 * | 7/2012 | Noda | | 713/153 |
| 2013/0055773 A1 * | 3/2013 | Li | | 70/278.1 |

OTHER PUBLICATIONS

Otrok et al., "Improving the Security of SNMP in Wireless Networks", 2005.*

Reyhani et al., "User Authentication Using Neural Network in Smart Home Networks", 2007.*

Steiner et al., "Kerberos: An Authentication Service for Open Network Systems", 1988.*

\* cited by examiner

ENABLING ACCESS TO REMOVABLE HARD DISK DRIVES

BACKGROUND

1. Field:

The present disclosure relates generally to data processing systems and, in particular, to storage devices used in data processing systems. Still more particularly, the present disclosure relates to accessing a removable storage device connected to a data processing system while the operating system is running.

2. Description of the Related Art

Storage devices, such as hard disk drives, solid state disk drives, flash drives, and other suitable types of storage, are used to store information in a data processing system. These types of storage devices may use encryption software or hardware to encrypt some or all of the data on the storage device. For example, in a hard disk drive, full disk encryption or file-system level encryption may be used to encrypt data. File-system level encryption encrypts the files but does not typically encrypt file system metadata. With full disk encryption, every bit of data that is stored on the hard disk drive is encrypted. Full disk encryption may be used with a truss-to-platform module. A truss-to-platform module is a crypto processor that may be embedded in the motherboard and used to authenticate the hard disk drive. A crypto processor is a dedicated processor for carrying out cryptographic operations. With full disk encryption, access to a hard disk drive is provided only with the proper authentication of the entity requesting access. This entity may be a user entering a user identifier and password, a truss-to-platform module sending the appropriate token or key, or some other suitable entity. Without proper authentication, access to the data on the hard disk drive does not occur.

Various mechanisms are present for allowing a hard disk drive to be moved from one computer to another computer. For example, when a hard disk drive is moved to another computer, a password may be given to that computer to provide access to the hard disk drive.

SUMMARY

In one illustrative embodiment, a method, apparatus, and computer program product are provided for accessing a device. The device receives a key from an operating system in response to the device in a locked state being connected to a data processing system after the operating system for the data processing system is running. The device compares the key received from the operating system with a set of keys stored in the device. The key is based on a system identifier for the data processing system and a password. The device determines whether a match is present between the key and the set of keys. The device changes the device from the locked state to an unlocked state in response to a determination that the match is present.

DETAILED DESCRIPTION

As will be appreciated by one skilled in the art, the present invention may be embodied as a system, method, or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "circuit," "module," or "system." Furthermore, the present invention may take the form of a computer program product embodied in any tangible medium of expression having computer usable program code embodied in the medium.

Any combination of one or more computer usable or computer readable medium(s) may be utilized. The computer usable or computer readable medium may be, for example, but not limited to, an electronic, magnetic, optical, electromagnetic, infrared, or semiconductor system, apparatus, device, or propagation medium. More specific examples (a non-exhaustive list) of the computer readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media, such as those supporting the Internet or an intranet, or a magnetic storage device.

Note that the computer usable or computer readable medium could even be paper or another suitable medium upon which the program is printed, as the program can be electronically captured via, for instance, optical scanning of the paper or other medium, then compiled, interpreted, or otherwise processed in a suitable manner, if necessary, and then stored in a computer memory. In the context of this document, a computer usable or computer readable medium may be any medium that can contain, store, communicate, propagate, or transport the program for use by or in connection with the instruction processing system, apparatus, or device. The computer usable medium may include a propagated data signal with the computer-usable program code embodied therewith, either in baseband or as part of a carrier wave. The computer usable program code may be transmitted using any appropriate medium, including, but not limited to, wireless, wireline, optical fiber cable, RF, etc.

Computer program code for carrying out operations of the present invention may be written in any combination of one or more programming languages, including an object-oriented programming language, such as Java, Smalltalk, C++, or the like and conventional procedural programming languages, such as the "C" programming language or similar programming languages. The program code may be processed entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowcharts and/or block diagrams of methods, apparatus (systems), and computer program products according to embodiments of the invention. It will be understood that each block of the flowcharts and/or block diagrams, and combinations of blocks in the flowcharts and/or block diagrams, can be implemented by computer program instructions.

These computer program instructions may be provided to a processor of a general purpose computer, special purpose computer, or other programmable data processing apparatus to produce a machine, such that the instructions, which are processed via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which are processed on the computer or other programmable apparatus provide processes for implementing the functions/acts specified in the flowchart and/or block diagram block or blocks.

Figure 1:
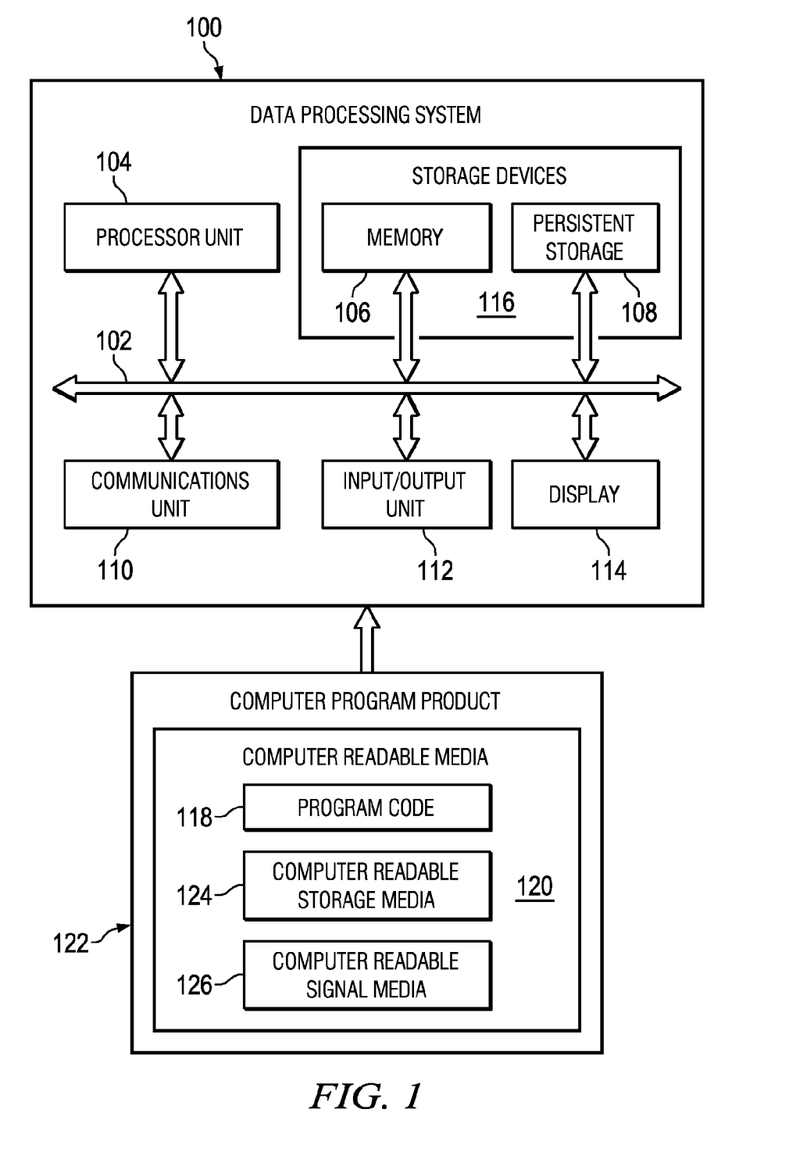
FIG. 1 is an illustration of a data processing system in accordance with an illustrative embodiment.

Turning now to FIG. 1, an illustration of a data processing system is depicted in accordance with an illustrative embodiment. In this illustrative example, data processing system 100 includes communications fabric 102, which provides communications between processor unit 104, memory 106, persistent storage 108, communications unit 110, input/output (I/O) unit 112, and display 114.

Processor unit 104 serves to execute instructions for software that may be loaded into memory 106. Processor unit 104 may be a set of processors, a multi-processor core, or some other type of processor, depending on the particular implementation. A set, as used herein with reference to an item, means one or more items. Further, processor unit 104 may be implemented using a number of heterogeneous processor systems in which a main processor is present with secondary processors on a single chip. As another illustrative example, processor unit 104 may be a symmetric multi-processor system containing multiple processors of the same type.

Memory 106 and persistent storage 108 are examples of storage devices 116. A storage device is any piece of hardware that is capable of storing information, such as, for example, without limitation, data, program code in functional form, and/or other suitable information either on a temporary basis and/or a permanent basis. Memory 106, in these examples, may be, for example, a random access memory or any other suitable volatile or non-volatile storage device. Persistent storage 108 may take various forms, depending on the particular implementation.

For example, persistent storage 108 may contain one or more components or devices. For example, persistent storage 108 may be a hard drive, a flash memory, a rewritable optical disk, a rewritable magnetic tape, or some combination of the above. The media used by persistent storage 108 also may be removable. For example, a removable hard drive may be used for persistent storage 108.

Communications unit 110, in these examples, provides for communications with other data processing systems or devices. In these examples, communications unit 110 is a network interface card. Communications unit 110 may provide communications through the use of either or both physical and wireless communications links.

Input/output unit 112 allows for input and output of data with other devices that may be connected to data processing system 100. For example, input/output unit 112 may provide a connection for user input through a keyboard, a mouse, and/or some other suitable input device. Further, input/output unit 112 may send output to a printer. Display 114 provides a mechanism to display information to a user.

Instructions for the operating system, applications, and/or programs may be located in storage devices 116, which are in communication with processor unit 104 through communications fabric 102. In these illustrative examples, the instructions are in a functional form on persistent storage 108. These instructions may be loaded into memory 106 for processing by processor unit 104. The processes of the different embodiments may be performed by processor unit 104 using computer implemented instructions, which may be located in a memory, such as memory 106.

These instructions are referred to as program code, computer usable program code, or computer readable program code that may be read and processed by a processor in processor unit 104. The program code in the different embodiments may be embodied on different physical or computer readable storage media, such as memory 106 or persistent storage 108.

Program code 118 is located in a functional form on computer readable media 120 that is selectively removable and may be loaded onto or transferred to data processing system 100 for processing by processor unit 104. Program code 118 and computer readable media 120 form computer program product 122 in these examples. In one example, computer readable media 120 may be computer readable storage media 124 or computer readable signal media 126. Computer readable storage media 124 is a physical media configured to store program code and may include, for example, an optical or magnetic disk that is inserted or placed into a drive or other device that is part of persistent storage 108 for transfer onto a storage device, such as a hard drive, that is part of persistent storage 108. Computer readable storage media 124 also may take the form of a persistent storage, such as a hard drive, a thumb drive, or a flash memory, that is connected to data processing system 100. In some instances, computer readable storage media 124 may not be removable from data processing system 100. In these illustrative examples, computer readable storage media 124 is a non-transitory computer readable storage medium.

Alternatively, program code 118 may be transferred to data processing system 100 using computer readable signal media 126. Computer readable signal media 126 may be, for example, a propagated data signal containing program code 118. For example, computer readable signal media 126 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 118 may be downloaded over a network to persistent storage 108 from another device or data processing system through computer readable signal media 126 for use within data processing system 100. For instance, program code stored in a computer readable storage medium in a server data processing system may be downloaded over a network from the server to data processing system 100. The data processing system providing program code 118 may be a server computer, a client computer, or some other device capable of storing and transmitting program code 118.

The different components illustrated for data processing system 100 are not meant to provide architectural limitations to the manner in which different embodiments may be implemented. The different illustrative embodiments may be implemented in a data processing system including components in addition to or in place of those illustrated for data processing system 100. Other components shown in FIG. 1 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

As another example, a storage device in data processing system 100 is any hardware apparatus that may store data. Memory 106, persistent storage 108, and computer readable media 120 are examples of storage devices in a tangible form.

In another example, a bus system may be used to implement communications fabric 102 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 106, or a cache, such as found in an interface and memory controller hub that may be present in communications fabric 102.

The different illustrative embodiments recognize and take into account a number of different considerations. For example, the different illustrative embodiments recognize and take into account that encrypted storage devices have limitations with respect to removable storage devices. For example, the different illustrative embodiments recognize that a hard disk drive that is password protected cannot always be connected and accessed by an operating system that is already running.

In some cases, if the hard disk drive is connected to the data processing system after the operating system is running, the state of the data processing system is changed to obtain a prompt for the hard disk drive prior to the operating system starting up.

For example, the data processing system may be powered down and back up to cause the basic input/output system (BIOS) to prompt for the password for the hard disk drive. The different illustrative embodiments also recognize and take into account that if a hard disk drive is to be used by different users, the password is provided to the different users. As a result, when a password changes for the hard disk drive, coordination is required to provide the password to the different users. Further, a common password also may result in security concerns with shared passwords.

In some hard disk drives, the protection mechanism for the hard disk drive stores the password on the hard disk drive. This password is provided every time the hard disk drive is powered up before access to data on the hard disk drive occurs. As a result, the hard disk drive has hardware that encrypts and decrypts data. The decryption of data for access by a basic input/output system or an operating system only occurs when the password is provided to the hardware in the hard disk drive.

Thus, the different illustrative embodiments provide a method and apparatus for accessing a device. In some illustrative embodiments, a key is received from an operating system running on a data processing system in response to the device being connected to the data processing system in a locked state. The device compares the key received from the operating system with a set of keys stored in the device. The key is based on an identifier for the data processing system and a password. The device determines whether a match is present between the key and the set of keys. In response to a determination that a match is present, the device changes from the locked state to an unlocked state. As a result, the device can now be accessed.

Figure 2:
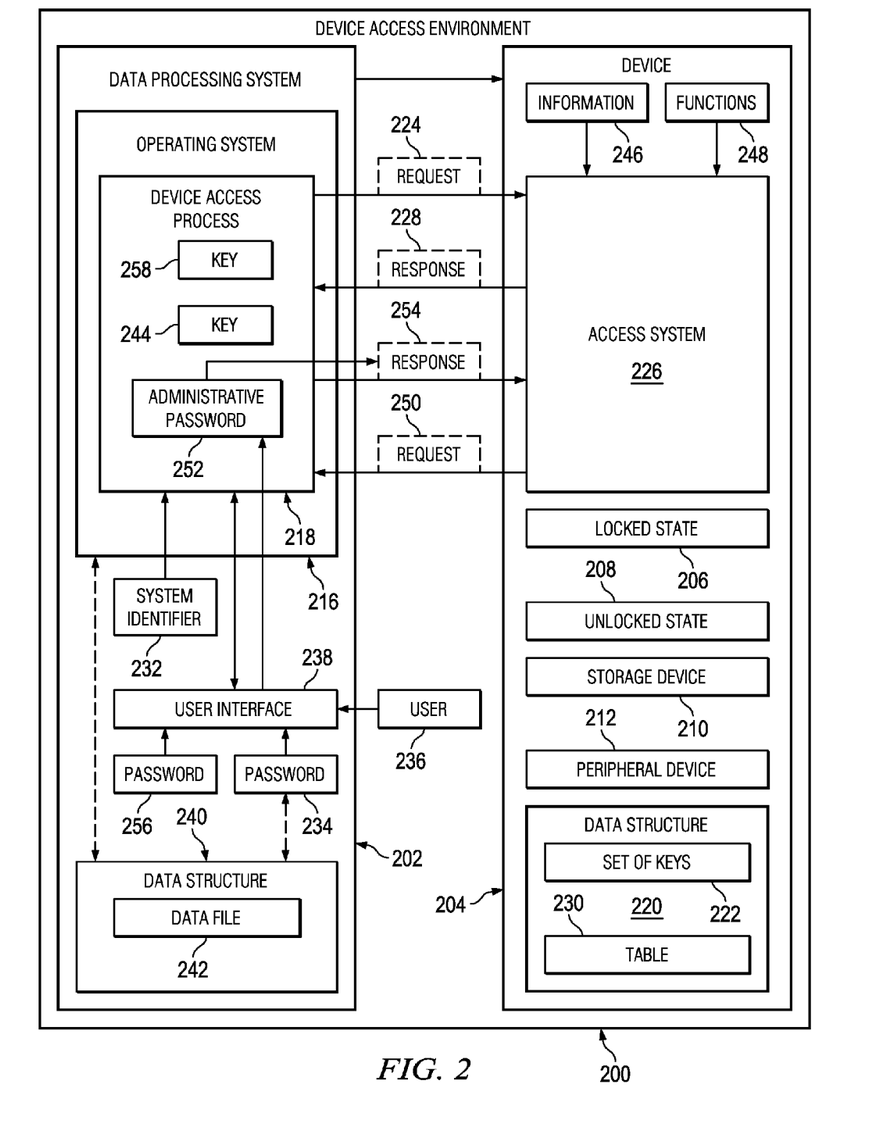
FIG. 2 is an illustration of a device access environment in accordance with an illustrative embodiment.

With reference now to FIG. 2, an illustration of a device access environment is depicted in accordance with an illustrative embodiment. Device access environment 200 is an example of an environment that may be implemented using data processing system 100 in FIG. 1. In these illustrative examples, data processing system 202 is connected to device 204.

Device 204 may have locked state 206 and unlocked state 208. In locked state 206, device 204 may not be accessed or used by data processing system 202. In unlocked state 208, device 204 may be accessed by data processing system 202. Device 204 may be removable or unremovable from data processing system 202. In these illustrative examples, device 204 may take a number of different forms. For example, device 204 may be selected from one of storage device 210, peripheral device 212, and/or any other suitable device. If device 204 takes the form of storage device 210, device 204 may be, for example, without limitation, a hard disk drive, a solid state drive, a flash drive, or some other suitable type of storage device. When device 204 takes the form of peripheral device 212, device 204 may be, for example, without limitation, a printer, a projector, a scanner, or some other suitable type of peripheral device.

Operating system 216 runs on data processing system 202 in the illustrative examples. Device access process 218 is an example of a process running in operating system 216 that may be used to access device 204.

When device 204 is removable, device 204 may be connected to data processing system 202 prior to data processing system 202 being started or after data processing system 202 has been started. When device 204 is connected to data processing system 202 when operating system 216 is running, device access process 218 in operating system 216 queries device 204 to determine whether data structure 220 with set of keys 222 is present in device 204. A set, as used herein with reference to items, refers to one or more items. For example, a set of keys is one or more keys.

In these examples, device access process 218 may send request 224 to access system 226 in device 204. Access system 226 returns response 228, which indicates whether data structure 220 is present. In these illustrative examples, data structure 220 may take the form of table 230. In these examples, device access process 218 obtains system identifier 232 and password 234. System identifier 232 is a unique identifier identifying data processing system 202 from other data processing systems.

Password 234 may be a password stored by device access process 218. In some illustrative examples, password 234 may be obtained by prompting user 236 to enter password 234 in user interface 238. In other illustrative examples, password 234 may be stored by data processing system 202 in data structure 240. Data structure 240 may be, for example, without limitation, data file 242 maintained by operating system 216. Data file 242 may store passwords for various users of operating system 216.

After obtaining system identifier 232 and password 234, device access process 218 generates key 244 using system identifier 232 and password 234. Key 244 may be generated in a number of different ways. For example, key 244 may be system identifier 232 combined with password 234. In other illustrative examples, system identifier 232 and password 234 may be used with a hashing process to generate key 244. Operating system 216 sends key 244 to access system 226 in device 204.

Access system 226 determines whether key 244 matches a key in set of keys 222. If a match is found, device 204 is changed from locked state 206 to unlocked state 208. At this time, device 204 may be accessed by data processing system 202. This access may be to access information 246 stored on device 204, access functions 248 performed by device 204, or access a combination of the two.

If key 244 does not match a key in set of keys 222, device 204 remains in locked state 206. Access system 226 waits to receive administrative password 252 from data processing system 202. Device access process 218 in data processing system 202 recognizes that device 204 is still in locked state 206 and generates a prompt on user interface 238 for administrative password 252. User input for administrative password 252 may be sent in response 254 to access system 226 in device 204 by device access process 218.

Access system 226 determines whether administrative password 252 is valid. If the password is valid, then access system 226 grants access to data structure 220 to device access process 218. Once access to data structure 220 is granted, device access process 218 may determine whether space is available within data structure 220 to add additional keys. If space is available, a system identifier is retrieved by device access process 218. Additionally, password 256 also may be entered by user 236 in user interface 238. Password 256 and system identifier 232 are used to generate key 258. Device access process 218 stores key 258 in data structure 220. In other illustrative examples, key 258 may be sent to access system 226 by device access process 218 for storage in data structure 220.

If space is not available in data structure 220, keys may be deleted, if necessary, or the data structure may be changed in size, depending upon the particular implementation. In this manner, new users may be added that are allowed access to device 204.

The generation and deletion of keys may be performed through user interface 238 in these examples. Further, if data structure 220 is not present, device 204 may not have been configured for use by different users. In this case, administrative password 252 may be entered through user interface 238 by user 236. Then, user 236 may interact with access system 226 to create or populate data structure 220 with users.

In this manner, different users may have different passwords for accessing device 204. As a result, concerns with the sharing of passwords and with informing users of password changes may be reduced or avoided. Further, with the use of system identifier 232, the use of device 204 may be restricted to particular data processing systems. In this manner, the access to device 204 may be restricted both by users and by data processing systems.

These different illustrative embodiments provide a method and apparatus that allows a user to access devices. For example, when a device takes the form of a hard disk drive, the hard disk drive may be inserted into a bay of data processing system 202 once operating system 216 is running. The method and apparatus in the illustrative embodiments allows the data to be accessible in the hard disk drive without requiring data processing system 202 to be restarted or rebooted. Further, the different illustrative embodiments also provide an ability to use the removable hard disk drive in different computer systems without having to provide the password to each user of those computer systems.

The illustration of device access environment 200 in FIG. 2 is not meant to imply physical or architectural limitations to the manner in which different illustrative embodiments may be implemented. Other components in addition to and/or in place of the ones illustrated may be used. Some components may be unnecessary in some illustrative embodiments. Also, the blocks are presented to illustrate some functional components. One or more of these blocks may be combined and/or divided into different blocks when implemented in different illustrative embodiments.

For example, in some illustrative examples, more than one device may be connected to data processing system 202, in addition to device 204, in which each device may be unlocked and locked in the same manner. Although the depicted examples illustrate the device as a storage device, the different illustrative examples may be applied to other types of devices. For example, other devices, such as routers, printers, video cameras, and other devices that may be connected to data processing system 202, may be accessed in the same manner as discussed above.

Figure 3:
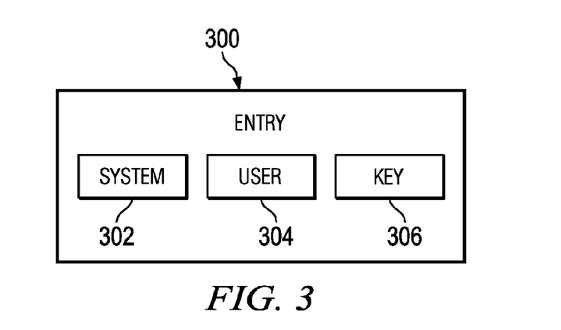
FIG. 3 is an illustration of an entry in a data structure containing a set of keys in accordance with an illustrative embodiment.

With reference now to FIG. 3, an illustration of an entry in a data structure containing a set of keys is depicted in accordance with an illustrative embodiment. In this illustrative example, entry 300 is an example of an entry that may be found in data structure 220 in which set of keys 222 in FIG. 2 is located. As depicted, entry 300 includes system 302, user 304, and key 306.

System 302 is an identification of the system for which access is permitted. System 302 may be a descriptive identifier, rather than a unique identifier. In some cases, a system identifier may be used for system 302. User 304 identifies the user that is allowed access to the device. Key 306 contains the key for which comparisons are made to determine whether the device should be changed from a locked state to an unlocked state.

Figure 4:
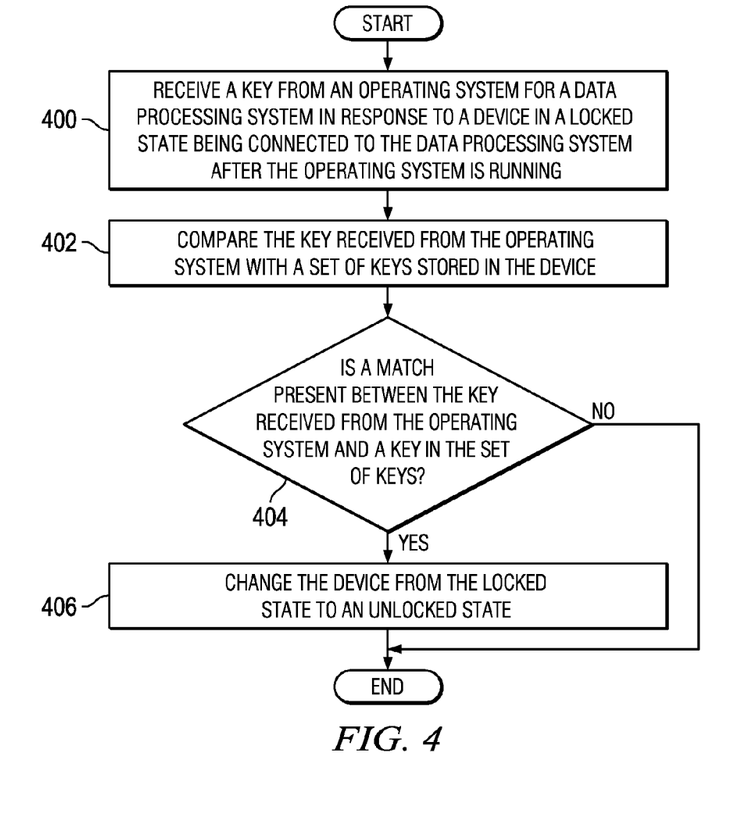
FIG. 4 is a flowchart of a process for accessing a device in accordance with an illustrative embodiment.

With reference now to FIG. 4, a flowchart of a process for accessing a device is depicted in accordance with an illustrative embodiment. In this illustrative example, the process illustrated in FIG. 4 may be implemented in program code running on a data processing system. In particular, the process may be implemented in access system 226 running on device 204 in FIG. 2.

The process begins with the device in a locked state. The process receives a key from the operating system for the data processing system in response to the device in the locked state being connected to the data processing system after the operating system is running (step 400). The device may be, for example, a storage device, a peripheral device, or some other suitable type of device. As one specific example, the device may be a hard disk drive.

The process then compares the key received from the operating system with a set of keys stored in the device (step 402). The key is based on an identifier for the data processing system and a password. The set of keys may be stored in a data structure, such as data structure 220 in FIG. 2. For example, the set of keys may be stored in the form of a table.

Thereafter, the process determines whether a match is present between the key received from the operating system and a key in the set of keys (step 404). In response to a determination that a match is present, the process changes the device from the locked state to an unlocked state (step 406), with the process terminating thereafter. With reference again to step 404, if a match is not present, the process terminates.

Figure 5A:
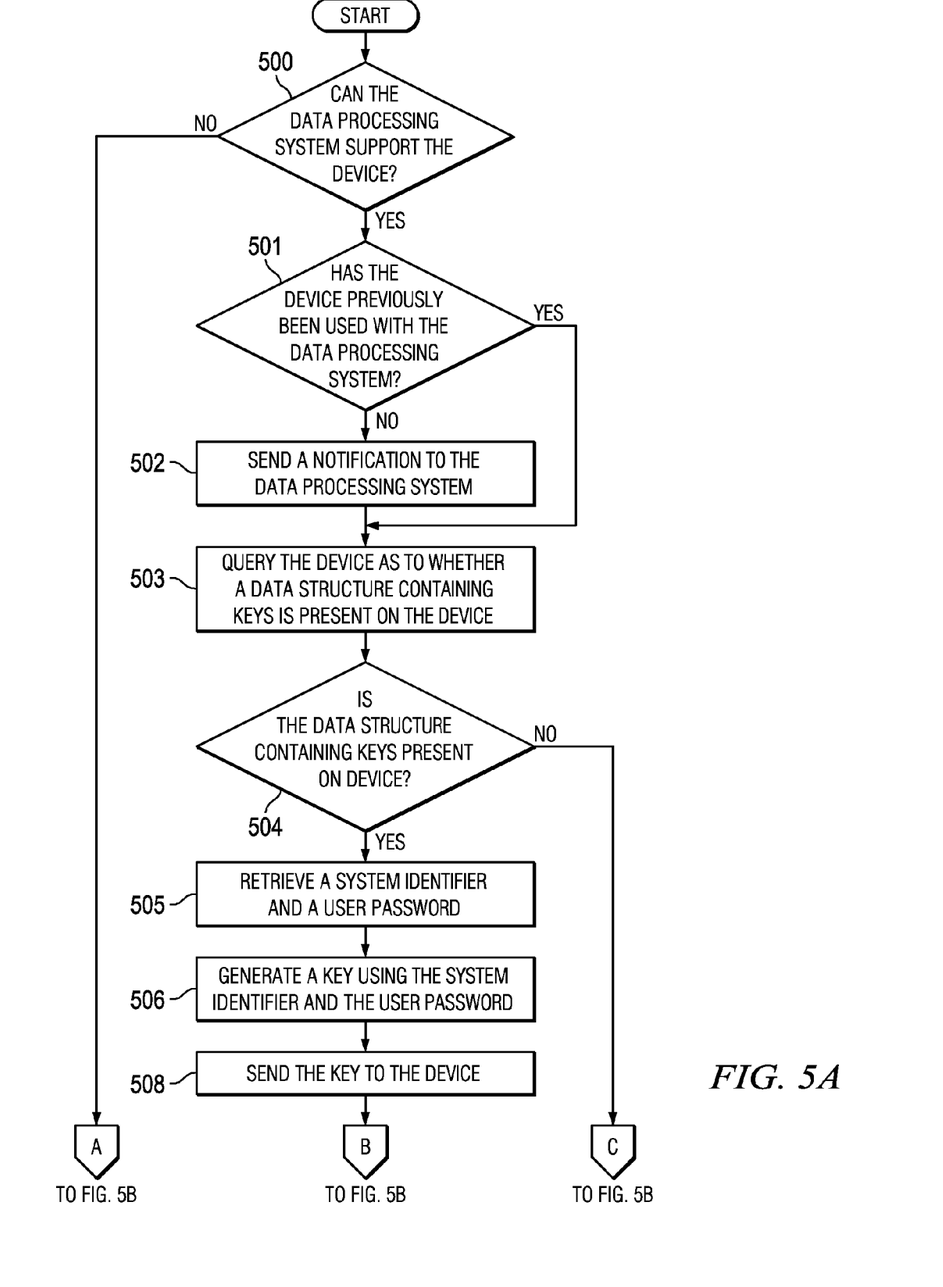
FIGS. 5A and 5B are illustrations of a flowchart of a process for accessing a device in accordance with an illustrative embodiment.
Figure 5B:
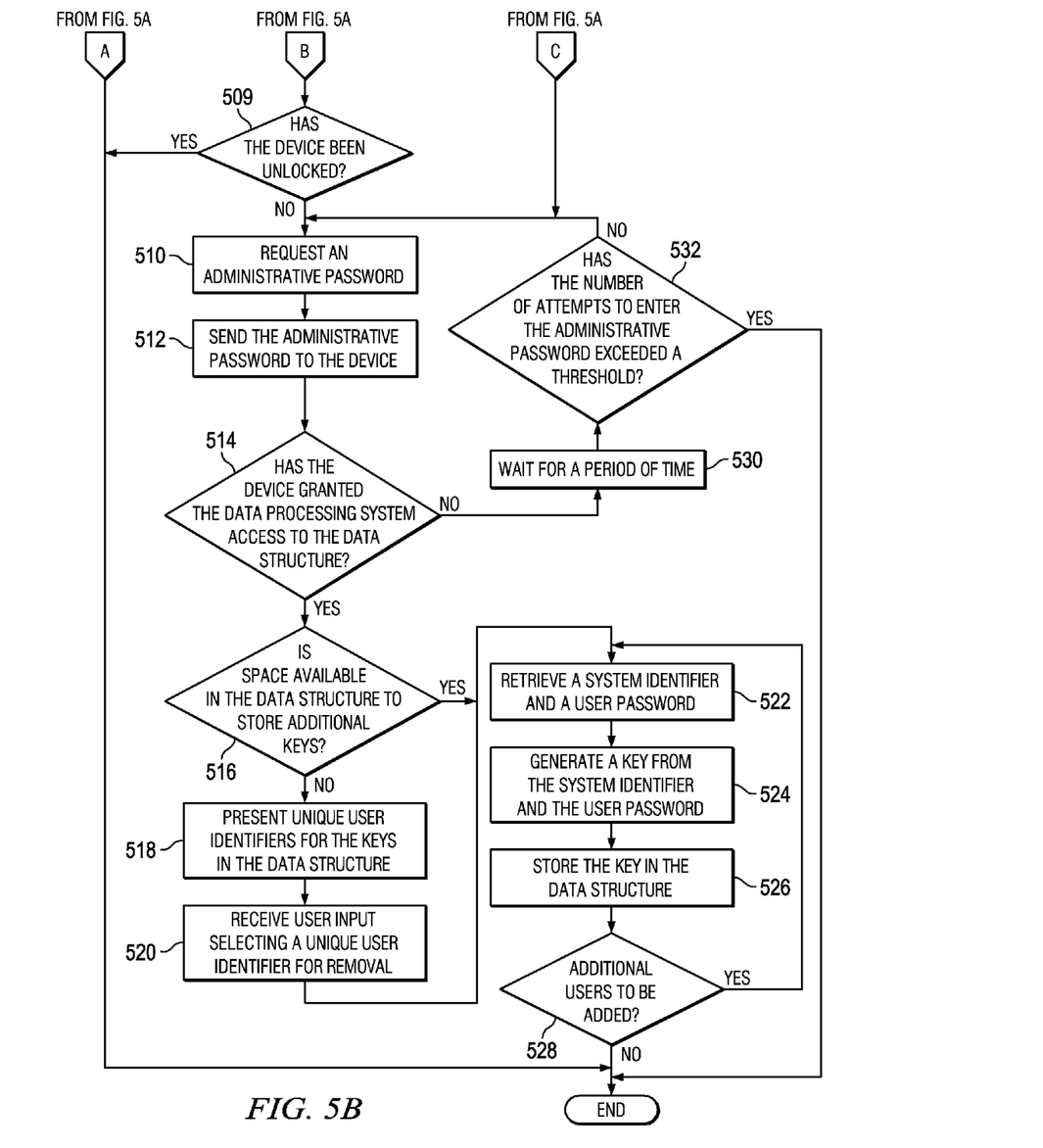

With reference now to FIGS. 5A and 5B, illustrations of a flowchart of a process for accessing a device are depicted in accordance with an illustrative embodiment. In this illustrative example, the process illustrated in FIGS. 5A and 5B may be implemented in program code running on a data processing system. In particular, the process may be implemented in operating system 216 in FIG. 2.

The process begins by determining whether the device can be supported by the data processing system (step 500). If the device cannot be supported, the process terminates. Otherwise, the process determines whether the device has previously been used with the data processing system (step 501). If the device has not been used with the data processing system before, the process sends a notification to the data processing system (step 502). The notification indicates that the device is being used with the data processing system for the first time. The notification may take the form of, for example, a security warning message. In this manner, the user may be able to check the validity of the device.

Thereafter, the process queries the device as to whether a data structure containing keys is present on the device (step 503). A determination is made as to whether the data structure containing keys is present on the device (step 504). If the data structure is present, the process retrieves a system identifier and a user password (step 505).

In these examples, the system identifier and the user password are retrieved through the operating system. In these examples, the system identifier is a unique system identifier for the data processing system on which the operating system is running. The system identifier may take a number of different forms. For example, the system identifier may be a media access control identifier for a component on the data processing system, a central processing unit identification number, a central processing unit serial number, a universally unique identifier (UUID), or some other suitable type of identifier.

The process then generates a key using the system identifier and the user password (step 506). The process sends the key to the device (step 508). Thereafter, the process determines whether the device has been unlocked (step 509). In other words, the process determines whether the device has been changed from a locked state to an unlocked state. In step 509, the device may not be unlocked if the user is not authorized for the device or if the device is not configured for different users.

If the device has been unlocked, the process terminates. Otherwise, the process requests an administrative password (step 510). The process then sends the administrative password to the device (step 512). A determination is made as to whether the device has granted the data processing system access to the data structure in the device (step 514). In step 514, access may be granted by the device when the administrative password is determined by the device to be valid.

If access has been granted to the data structure, the process determines whether space is available in the data structure to store additional keys (step 516). If space is not available in the data structure, the process presents unique user identifiers for the keys in the data structure (step 518). The process then receives user input selecting a unique user identifier for removal (step 520).

Thereafter, the process retrieves a system identifier and a user password (step 522). In step 522, the user password may be obtained by prompting a user for a password using a user interface. The process then generates a key from the system identifier and the user password (step 524). The process then stores the key in the data structure (step 526).

Next, a determination is made as to whether additional users are to be added (step 528). If additional users are to be added, the process returns to step 522 to request another user password. Otherwise, the process terminates.

With reference again to step 516, if space is available in the data structure, the process proceeds to step 522 as described above.

With reference again to step 514, if the administrative password is not correct, the process waits for a period of time (step 530). After the period of time, a determination is made as to whether the number of attempts to enter the administrative password has exceeded a threshold (step 532). If the threshold for the number of attempts has not been exceeded, the process returns to step 510. Otherwise, the process terminates.

With reference again to step 504, if the data structure is not present, the process proceeds to step 510, as described above. With reference again to step 501, if the device has been used with the data processing system before, the process continues to step 503 as described above.

Figure 6:
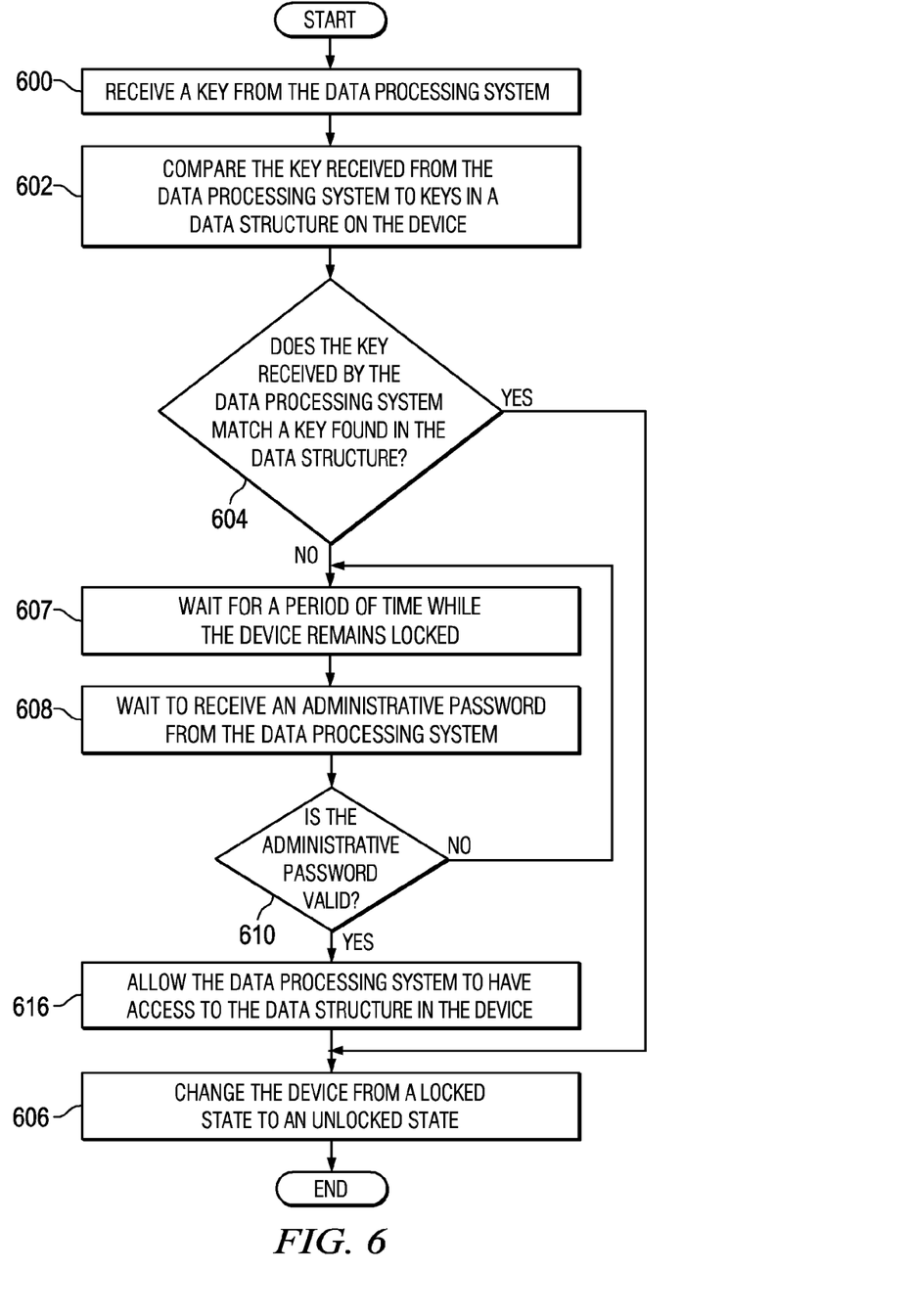
FIG. 6 is a flowchart of a process for accessing a device in accordance with an illustrative embodiment.

With reference now to FIG. 6, a flowchart of a process for accessing a device is depicted in accordance with an illustrative embodiment. In this illustrative example, the process illustrated in FIG. 6 may be implemented in device 204 in FIG. 2 to which access is desired. For example, this process may be implemented in hardware, software, or a combination of the two located on the device.

The process begins with the device in a locked state. The device receives a key from the data processing system (step 600). Thereafter, the device compares the key received from the data processing system to keys in a data structure on the device (step 602). In these examples, the data structure may be a table. The key may be compared to keys stored in various entries in the table. The entries may take the form of, for example, entry 300 in FIG. 3.

A determination is made as to whether the key that has been received by the data processing system matches a key found in the data structure (step 604). If a key is found in the data structure that matches the key received by the data processing system, the device changes the device from a locked state to an unlocked state (step 606). At this point, access to the device by the operating system is allowed, with the process terminating thereafter.

With reference again to step 604, if a match between the key received by the data processing system and the keys in the data structure is not found, the device remains in a locked state and the process waits for a period of time (step 607). The period of time may be a few milliseconds, a few seconds, a few minutes, or some other suitable period of time. The period of time may last until the data processing system recognizes that the device is still in a locked state. Thereafter, the process waits to receive an administrative password from the data processing system (step 608). In step 608, the administrative password may be received when the data processing system sends the administrative password in step 512 in FIG. 5.

Thereafter, a determination is made as to whether the administrative password is valid (step 610). If the administrative password is not valid, the process returns to step 607 as described above. In other illustrative examples, the device may wait to receive a notification from the data processing system indicating whether the process is to terminate or to return to step 607 as described above.

With reference again to step 610, if the administrative password is valid, the process allows the data processing system to have access to the data structure in the device (step 616). Thereafter, the process proceeds to step 606 as described above.

The flowchart and block diagrams in the figures illustrate the architecture, functionality, and operation of possible implementations of systems, methods, and computer program products according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, operations for two blocks shown in succession may, in fact, be performed substantially concurrently, or the blocks may sometimes be performed in the reverse order, depending upon the functionality involved. It will also be noted that each block of the block diagrams and/or flowcharts, and combinations of blocks in the block diagrams and/or flowcharts, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment, or an embodiment containing both hardware and software elements. In a preferred embodiment, the invention is implemented in software, which includes, but is not limited to, firmware, resident software, microcode, etc.

Furthermore, the invention can take the form of a computer program product accessible from a computer usable or computer readable medium providing program code for use by or in connection with a computer or any instruction processing system. For the purposes of this description, a computer usable or computer readable medium can be any tangible apparatus that can contain, store, communicate, propagate, or transport the program for use by or in connection with the instruction processing system, apparatus, or device.

The medium can be an electronic, magnetic, optical, electromagnetic, infrared, or semiconductor system (or apparatus or device) or a propagation medium. Examples of a computer readable medium include a semiconductor or solid state memory, magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

A data processing system suitable for storing and/or executing program code will include at least one processor coupled directly or indirectly to memory elements through a system bus. The memory elements can include local memory employed during actual processing of the program code, bulk storage, and cache memories, which provide temporary storage of at least some program code in order to reduce the number of times code must be retrieved from bulk storage during processing of the program code.

Input/output or I/O devices (including, but not limited to, keyboards, displays, pointing devices, etc.) can be coupled to the system either directly or through intervening I/O controllers.

Network adapters may also be coupled to the system to enable the data processing system to become coupled to other data processing systems, remote printers, or storage devices through intervening networks. Modems, cable modem, and Ethernet cards are just a few of the currently available types of network adapters.

The description of the present invention has been presented for purposes of illustration and description and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for accessing a device, the method comprising:

storing, by the device, a set of keys in a data structure in the device;

responsive to the device in a locked state being connected to a data processing system after an operating system running on the data processing system is running, receiving, by the device, a first key from the operating system, wherein the device may not be accessed or used by the data processing system while in a locked state, wherein the device is selected from one of a storage device, a peripheral device, a hard disk drive, a solid state drive, a universal serial bus drive, and a printer;

comparing, by the device, the first key received from the operating system for the data processing system with the set of keys stored in the device, wherein the first key is based on a system identifier for the data processing system and a first password;
determining, by the device, whether a match is present between the first key and the set of keys;
responsive to a determination that the match is present, changing, by the device, the device from the locked state to an unlocked state;
responsive to an absence of the determination that the match is present, waiting, by the device, for an administrative password for the device;
responsive determining that the administrative password is valid, determining, by the device, whether space is available within the data structure to add additional keys;
responsive to determining that space is available within the data structure, retrieving, by the device, the system identifier from the data processing system, and receiving the password;
responsive to retrieving the system identifier and receiving the password, generating a second key, wherein the key is based on a system identifier for the data processing system and a second password; and
responsive to generating the second key, storing the second key in the data structure.

2. The method of claim 1 further comprising:
identifying, by the operating system, the system identifier and the password; and
generating, by the operating system, the key using the system identifier and the password.

3. The method of claim 1 further comprising:
responsive to the device in the locked state being connected to the data processing system after the operating system for data processing system is running, determining, by the device, whether the device has been enabled for use with the data processing system; and
responsive to a determination that the device has not been enabled for use with the data processing system, preventing, by the device, activating the changing step.

4. The method of claim 1, wherein the data structure is a table.

5. The method of claim 1 further comprising:
receiving, by the device, the second key from the operating system;
comparing, by the device, the second key received from the operating system for the data processing system with the set of keys stored in the device, wherein the second key is based on the system identifier for the data processing system and a second password;
determining, by the device, whether a match is present between the second key and the set of keys; and
responsive to a determination that the match is present, changing, by the device, the device from the locked state to an unlocked state.

6. An apparatus comprising:
a device having a set of keys stored thereon, wherein the device has a locked state and an unlocked state; and
an access system located in the device, wherein the access system is configured to receive a first key from an operating system in response to the device in the locked state being connected to a data processing system after the operating system running on the data processing system is running, wherein the device may not be accessed or used by the data processing system while in a locked state, wherein the device is selected from one of a storage device, a peripheral device, a hard disk drive, a solid state drive, a universal serial bus drive, and a printer; compare the first key received from the operating system for the data processing system with the set of keys stored in the device, wherein the first key is based on a system identifier for the data processing system and a first password; determine whether a match is present between the first key and the set of keys; and change the device from the locked state to an unlocked state in response to a determination that the match is present; wait for an administrative password for the device in response to an absence of the determination that the match is present; determine whether space is available within the data structure to add additional keys in response to determining that the administrative password is valid; retrieve a system identifier for the data processing system and receive a password in response to determining that space is available within the data structure; generate a second key, wherein the second key is based on a system identifier for the data processing system and a second password, in response to retrieving the system identifier and receiving the password; and store the second key in the data structure in response to generating a second key.

7. The apparatus of claim 6, wherein the operating system is configured to identify the system identifier and the password; and generate the key using the system identifier and the password.

8. The apparatus of claim 6, wherein the access system is configured to store the set of keys in a data structure in the device.

9. The apparatus of claim 6, wherein the access system is configured to determine whether the device has been enabled for use with the data processing system in response to the device in the locked state being connected to the data processing system after the operating system for the data processing system is running; and prevent activating the changing step in response to a determination that the device has not been enabled for use with the data processing system.

10. The apparatus of claim 8, wherein the data structure is a table.

11. The apparatus of claim 6, wherein the access system is further configured:
to receive the second key from the operating system;
to compare the second key received from the operating system for the data processing system with the set of keys stored in the device, wherein the second key is based on the system identifier for the data processing system and a second password;
to determine whether a match is present between the second key and the set of keys; and
in response to a determination that the match is present, to change the device from the locked state to an unlocked state.

12. A computer program product for accessing a device comprising:
a non-transitory computer readable storage medium;
program code, stored on the computer readable storage medium, for storing a set of keys in a data structure in the device;
program code, stored on the computer readable storage medium, for receiving a first key from an operating system in response to the device in a locked state being connected to a data processing system after the operating system running on the data processing system is running, wherein the device may not be accessed or used by the data processing system while in a locked state, wherein the device is selected from one of a storage device, a peripheral device, a hard disk drive, a solid state drive, a universal serial bus drive, and a printer;
program code, stored on the computer readable storage medium, for comparing the first key received from the operating system for the data processing system with a set of keys stored in the device, wherein the first key is based on a system identifier for the data processing system and a first password;

program code, stored on the computer readable storage medium, for determining whether a match is present between the first key and the set of keys;

program code, stored on the computer readable storage medium, for changing the device from the locked state to an unlocked state in response to a determination that the match is present;

program code, stored on the computer readable storage medium, for waiting for an administrative password for the device in response to an absence of the determination that the match is present;

program code, stored on the computer readable storage medium, for determining whether space is available within the data structure to add additional keys in response to determining that the administrative password is valid;

program code, stored on the computer readable storage medium, for retrieving a system identifier for the data processing system and for receiving a password in response to determining that space is available within the data structure;

program code, stored on the computer readable storage medium, for generating a second key, wherein the second key is based on a system identifier for the data processing system and a second password, in response to retrieving the system identifier and receiving the password; and program code, stored on the computer readable storage medium, for storing the second key in the data structure in response to generating a second key.

13. The computer program product of claim 12 further comprising:

program code, stored on the computer readable storage medium, for requesting an administrative password for the device in response to an absence of the determination that the match is present.

14. The computer program product of claim 12 further comprising:

program code, stored on the computer readable storage medium, for storing the set of keys in a data structure in the device.

15. The computer program product of claim 12 further comprising:

program code, stored on the computer readable storage medium, for determining whether the device has been enabled for use with the data processing system in response to the device in the locked state being connected to the data processing system after the operating system for the data processing system is running; and program code, stored on the computer readable storage medium, for preventing activating the changing step in response to a determination that the device has not been enabled for use with the data processing system.

16. The computer program product of claim 15, wherein the data structure is a table.

17. The computer program product of claim 12 further comprising:

program code, stored on the computer readable storage medium, for receiving the second key from the operating system;

program code, stored on the computer readable storage medium, for comparing the second key received from the operating system for the data processing system with the set of keys stored in the device, wherein the second key is based on the system identifier for the data processing system and a second password;

program code, stored on the computer readable storage medium, for determining whether a match is present between the second key and the set of keys; and program code, stored on the computer readable storage medium, in response to a determination that the match is present, for changing the device from the locked state to an unlocked state.

* * * * *